(12) United States Patent
Zheng

(10) Patent No.: US 9,063,285 B2
(45) Date of Patent: Jun. 23, 2015

(54) APPARATUS AND METHOD FOR ARC CALIBRATION OF FUSION SPLICERS

(75) Inventor: Wenxin Zheng, Ellicott City, MD (US)

(73) Assignee: AFL Telecommunications LLC, Spartanburg, SC (US)

( * ) Notice: Subject to any disclaimer, the term of this patent is extended or adjusted under 35 U.S.C. 154(b) by 889 days.

(21) Appl. No.: 13/148,590

(22) PCT Filed: Apr. 21, 2011

(86) PCT No.: PCT/US2011/033401
§ 371 (c)(1),
(2), (4) Date: Aug. 9, 2011

(87) PCT Pub. No.: WO2011/133753
PCT Pub. Date: Oct. 27, 2011

(65) Prior Publication Data
US 2011/0309056 A1    Dec. 22, 2011

Related U.S. Application Data

(60) Provisional application No. 61/326,289, filed on Apr. 21, 2010.

(51) Int. Cl.
*B23K 9/00*    (2006.01)
*G02B 6/255*    (2006.01)

(52) U.S. Cl.
CPC ............ *G02B 6/2551* (2013.01); *G02B 6/2553* (2013.01)

(58) Field of Classification Search
CPC ...... G02B 6/2551; G02B 6/2553; G02B 6/24; G02B 6/2555; B23K 9/00; B23K 9/0953; B23K 9/0026
USPC .......................................... 385/97, 98; 65/407
See application file for complete search history.

(56) References Cited

U.S. PATENT DOCUMENTS

| 5,909,527 | A | 6/1999 | Zheng |
| 6,097,426 | A | 8/2000 | Esmaeli |
| 6,294,760 | B1 * | 9/2001 | Inoue et al. .................... 219/383 |
| 6,676,307 | B1 * | 1/2004 | Yang et al. ...................... 385/96 |
| 6,966,708 | B2 * | 11/2005 | Hattori .............................. 385/96 |
| 7,699,541 | B2 * | 4/2010 | Ozawa et al. .................... 385/96 |
| 7,762,720 | B1 * | 7/2010 | Zhu et al. ....................... 374/131 |
| 7,900,480 | B2 * | 3/2011 | Hattori .............................. 65/377 |
| 2005/0002607 | A1 * | 1/2005 | Neuhaus et al. ................. 385/31 |
| 2005/0063664 | A1 * | 3/2005 | Huang ........................... 385/147 |
| 2005/0254754 | A1 * | 11/2005 | Huang et al. ..................... 385/52 |
| 2006/0133745 | A1 | 6/2006 | Takayanagi et al. |
| 2006/0171643 | A1 | 8/2006 | Hattori |

* cited by examiner

*Primary Examiner* — Mark Paschall
(74) *Attorney, Agent, or Firm* — Sughrue Mion, PLLC

(57) ABSTRACT

A method of calibrating a fusion splicer, including: heating ends of a first and second fiber with an arc; measuring fiber end melt-back at a corner of the first fiber and a corner of the second fiber; increasing the heat of the arc and heating the ends of the first and second fibers with the arc; measuring fiber end melt-back at the corner of the first fiber and the corner of the second fiber; determining a slope of the fiber end melt-back; and based on said slope, setting a value to adjust the heat produced by the splicer.

7 Claims, 16 Drawing Sheets

Fiber ends after Arc Cal

Figure 2

| Cladding Dia. | 250μm | 400μm | 250-125 | 400-125 | 400-250 |
|---|---|---|---|---|---|
| Electrode Gap | Narrow | Wide | Narrow | Wide | Wide |

Figure 3

| Cladding Dia. | 250μm | 400μm | 250-125 | 400-125 | 400-250 |
|---|---|---|---|---|---|
| Electrode Gap | Narrow | Wide | Narrow | Wide | Wide |
| Using fiber dia. [μm] | 250 | 400 | 250 | 400 | 400 |
| Melt Back (L+R) [μm] | 110 | 220 | 110 | 50 | 110 |

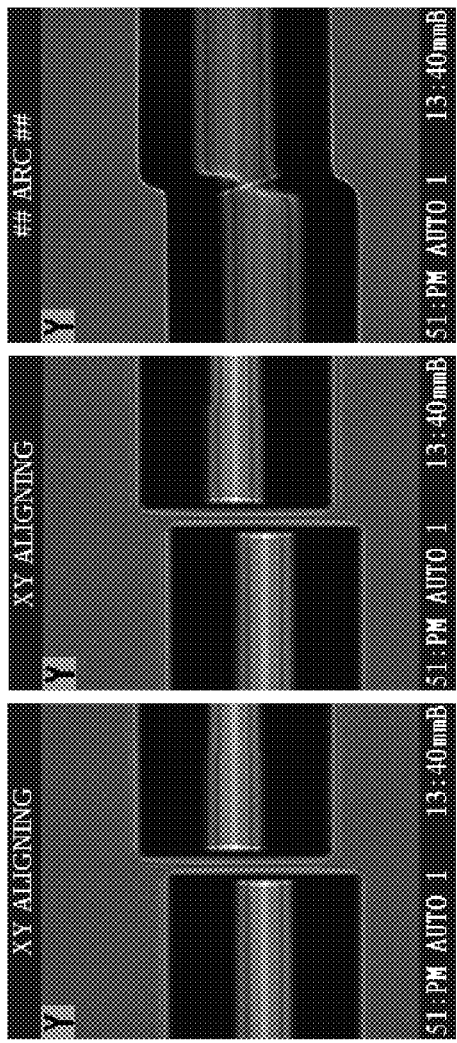
Figure 5A
Figure 5B
Figure 5C
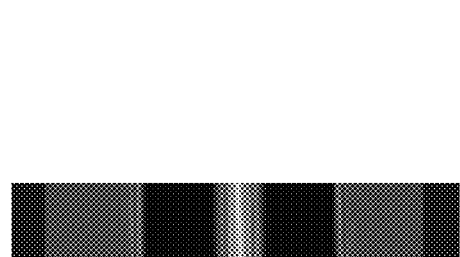
Figure 5E
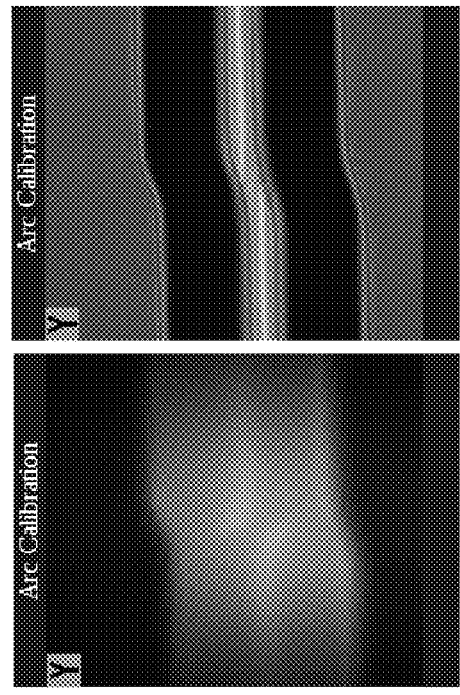
Figure 5D

1. Measure arc center

2. Measure gap distance at fiber corner

3. Heat ends with low power arc

4. Measure fiber ends melt-back (Gap2-Gap1) at fiber corners

5. Increase arc power and repeat steps 3 and 4

6. Compute AP value from melt-back slope and set new AP to splicer

Arc power is good

Arc power too low

APPARATUS AND METHOD FOR ARC CALIBRATION OF FUSION SPLICERS

CROSS REFERENCE TO RELATED APPLICATIONS

This application is a National Stage of International Application No. PCT/US2011/033401 filed Apr. 21, 2011, claiming priority based on U.S. Provisional Application No. 61/326,289, filed Apr. 21, 2010, the contents of all of which are incorporated herein by reference in their entirety.

CROSS REFERENCE TO RELATED APPLICATIONS

This application is based upon and claims the benefit of priority from U.S. Provisional Application No. 61/326,289, filed Apr. 21, 2010, in the United States Patent and Trademark Office, the disclosure of which is incorporated herein in its entirety by reference.

BACKGROUND

1. Field

The invention is related to fusion splicing of optical fibers, and more particularly to a method of calibrating the arc of a fusion splicer.

2. Related Art

Fusion splicing is the act of joining two optical fibers end-to-end using heat. The goal is to fuse the two fibers together in such a way that light passing through the fibers is not scattered or reflected back by the splice, and so that the splice and the region surrounding it are almost as strong as the fiber itself. The source of heat is usually an electric arc, but can also be a laser, or a gas flame, or a tungsten filament through which current is passed.

A basic fusion splicing apparatus consists of two fixtures on which the fibers are mounted and two electrodes. The fibers are placed into the apparatus, aligned, and then fused together. The development of automated fusion-splicing machines have made electric arc fusion (arc fusion) one of the most popular splicing techniques in commercial applications. Examples of fusions splicers include Fujikura model nos. FSM-45F, FSM-PM, FSM100M and FSM100P.

The gap between an electrode pair can be adjustable either manually or automatically driven with motors. See for example FIGS. 1A and 1B. FIG. 1A shows a wide gap between an electrode pair and FIG. 1B shows a narrow gap between an electrode pair. When the gap of electrode is larger, the arc power/current would be higher and arc shape would be wider. By controlling the gap, the heating temperature on the fiber will also be adjusted. Since there are tolerances in the mechanical and electrical components of the splicers, the heat generated by the arc may vary even when the power/current settings are the same. In addition, atmospheric conditions such as temperature, humidity, and pressure are constantly changing, which creates variability in the arc temperature. Therefore, it is necessary to calibrate the splicers in order to compensate for these discrepancies, because if possible, it is advantageous to operate a plurality of splicers at the same settings.

It is also necessary to take into account the diameter of the fiber being spliced when adjusting the gap between the electrodes that produce the arc. For example, when the cladding diameter is over 250 µm, the electrode gap should be set to a "wide" setting (e.g., 3 mm). FIG. 1A shows the electrodes pushed outward to enlarge the gap. On the other hand, when the cladding diameter is less than 250 µm, the electrode gap should be set to a "narrow" setting (e.g., 1 mm). FIG. 1B shows the electrodes pushed inward to shorten the gap.

When the fibers with different fiber cladding diameters are spliced, different arc power/current settings are required. Examples of typical power/current settings are shown in FIG. 2. For example, if a pair of fibers with 125 µm cladding diameters are to be spliced, a narrow electrode gap (e.g., 1 mm) is enough to supply an appropriate amount of heat. But for a fiber pair with 400 µm cladding diameters, a 3 mm wide electrode gap has to be used to provide enough heat to melt the fiber. In the case a 125 µm cladding diameter spliced to 400 µm cladding diameter, the wide electrode gap also needs to be used. Note that "250-125" in the table means that a 250 µm cladding diameter is being fused to a 125 µm cladding diameter.

There are two types of traditional arc calibration methods. One is the melt-back method with melt-back distance measured at axis (center) of fibers. When using this method, it is necessary to melt long portions of the fiber, which in turn causes large amounts of SiO2 to be deposited on the electrode tips, which changes the arc discharge condition. This method is still used in a number of field splicers which splices 125 µm cladding diameter telecommunication fibers. This melt-back method is shown in FIGS. 4A to 4D. FIG. 4A shows the fibers before melt-back. First, the fibers are heated so that the corners of the fiber "melt-back." FIG. 4B shows the fibers during melt-back. FIG. 4C shows the fibers after melt-back. FIG. 4D shows the measured fibers melt-back value shown on a display. The melt-back is measured at the closest points of two fibers. Since the fibers melt-back a lot when heated by a strong arc, they normally form a shape like match sticks. Therefore, the melt-back is normally measured at center of fiber axes. The measured melt-back amount is then compared to the melt-back amount for the particular fiber in a table, such as shown in FIG. 3. If the measured melt-back amount differs from the amount in the table, the power is adjusted accordingly and another melt-back is performed. This process is repeated until the measured melt-back is the same as the table value. This can be a very time-consuming process.

The second conventional arc calibration method splices the fiber with axis offset (see FIGS. 5A and 5B). After splicing, the distance of the offset changed from the original offset alignment due to the surface-tension pulling-back force during the arcing is measured. The higher the fiber temperature is, the higher distance of offset change is. This process has to be performed several times by re-arcing and re-measuring to get an average value (see FIGS. 5C to 5E). This method is also been used in many splicers for 125 µm cladding diameter fibers only. A problem with this method is that the pulling back distance depends not only on the fiber temperature, but also on the fiber cleave angle, fiber types, etc. You also need to splice the fiber first. For an unknown fiber type, e.g., 300 µm cladding diameter fiber, it is impossible to splice it first without knowing the correct power/current for the arc. Therefore, this method only works well with a certain fiber type (such as Corning fiber SMF28 of 125 µm cladding diameter) and does not work with other fibers, such as 400 µm large diameter fiber.

When splicing fibers with a narrow electrode gap (1 mm) at lower power (<100 bit), the offset arc calibration is typically run everyday. With the arc calibration, a set of Arc Power (AP) compensation coefficients will be updated to make arc power equal among different splicers and under different electrode conditions. The arc calibration will correctly compensate the arc power/current up to 100 bit with narrow electrode gap.

However, the offset arc calibration works only for 1 mm electrode gap, arc power<100 bit and fiber outside diameter<250 μm. In addition, there are other difficulties with the offset arc calibration method. Sometime the operator needs to repeat five or ten splicing processes for one successful arc calibration.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above. A first embodiment of the invention is a method of calibrating a fusion splicer, including: heating ends of a first and second fiber with an arc; measuring fiber end melt-back at a corner of the first fiber and a corner of the second fiber; increasing the heat of the arc and heating the ends of said first and second fibers with the arc; measuring fiber end melt-back at the corner of the first fiber and the corner of the second fiber; determining a slope of the fiber end melt-back; and based on the slope, setting a value to adjust the heat produced by the splicer.

In another embodiment, the heat is increased by increasing a power of the arc, and the value is a power value.

In another embodiment, the heat is increased by increasing a current of the arc, and the value is a current value.

In another embodiment, the fiber end melt-back is a distance.

In another embodiment, the fiber end melt-back is an area of the melted fiber.

In another embodiment, increasing the heat of the arc and heating the ends of the first and second fibers step is performed four to ten times.

Another embodiment of the invention is a method of calibrating a fusion splicer, includes: heating ends of a first and second fiber with an arc for a first predetermined amount of time; measuring fiber end melt-back at a corner of the first fiber and a corner of the second fiber; heating the ends of the first and second fibers with the arc for a second predetermined time, which is longer than said first predetermined time; measuring fiber end melt-back at the corner of the first fiber and the corner of the second fiber; determining a slope of the fiber end melt-back; and based on the slope, setting a value to adjust the heat produced by the splicer.

Another embodiment of the invention is a computer program product for calibrating a fusion splicer the computer program product including: a computer-readable storage medium having embodied thereon computer-readable code that, when executed by a processor, causes the splicer to perform a calibration method, the method including: heating ends of a first and second fiber with an arc; measuring fiber end melt-back at a corner of the first fiber and a corner of the second fiber; increasing the heat of the arc and heating the ends of the first and second fibers with the arc; measuring fiber end melt-back at the corner of the first fiber and the corner of the second fiber; determining a slope of the fiber end melt-back; and based on the slope, setting a value to adjust the heat produced by the splicer.

Another embodiment of the invention is a computer program product for calibrating a fusion splicer the computer program product including: a computer-readable storage medium having embodied thereon computer-readable code that, when executed by a processor, causes the splicer to perform a calibration method, the method including: heating ends of a first and second fiber with an arc for a first predetermined amount of time; measuring fiber end melt-back at a corner of the first fiber and a corner of said second fiber; heating the ends of the first and second fibers with the arc for a second predetermined time, which is longer than the first predetermined time; measuring fiber end melt-back at the corner of the first fiber and the corner of the second fiber; determining a slope of the fiber end melt-back; and based on the slope, setting a value to adjust the heat produced by the splicer.

Another embodiment of the invention is a splicer including: a plurality of electrodes; a processor and a memory; wherein the processor causes the splicer to perform a calibration method, the method including: heating ends of a first and second fiber with an arc; measuring fiber end melt-back at a corner of the first fiber and a corner of the second fiber; increasing the heat of the arc and heating the ends of the first and second fibers with said arc; measuring fiber end melt-back at the corner of the first fiber and the corner of the second fiber; determining a slope of the fiber end melt-back; and based on the slope, setting a value to adjust the heat produced by the splicer.

Another embodiment of the invention is a splicer including: a plurality of electrodes; a processor and a memory; wherein the processor causes the splicer to perform a calibration method, the method includes: heating ends of a first and second fiber with an arc for a first predetermined amount of time; measuring fiber end melt-back at a corner of the first fiber and a corner of the second fiber; heating the ends of the first and second fibers with the arc for a second predetermined time, which is longer than the first predetermined time; measuring fiber end melt-back at the corner of the first fiber and the corner of the second fiber; determining a slope of the fiber end melt-back; and based on the slope, setting a value to adjust the heat produced by the splicer.

BRIEF DESCRIPTION OF THE DRAWINGS

FIG. 2 is a table showing various gap settings for various cladding diameters.

FIG. 3 is a graph showing criteria of a traditional melt-back method used for an exemplary FSM-45 splicer.

FIGS. 5A-5E are pictures showing another conventional arc calibration method.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, the exemplary embodiments will be described with reference to accompanying drawings.

FIGS. 6A to 6F show an embodiment of the arc calibration method of the present invention. In the method, the melt-back is not measured at center of the each fiber. Instead, it is measured at a corner of each fiber. In this way, the method is more sensitive to the fiber shape variation. In addition, since significantly less power/current is needed for producing and measuring melt-back, fewer deposits will be formed on the electrodes.

Figure 1A:
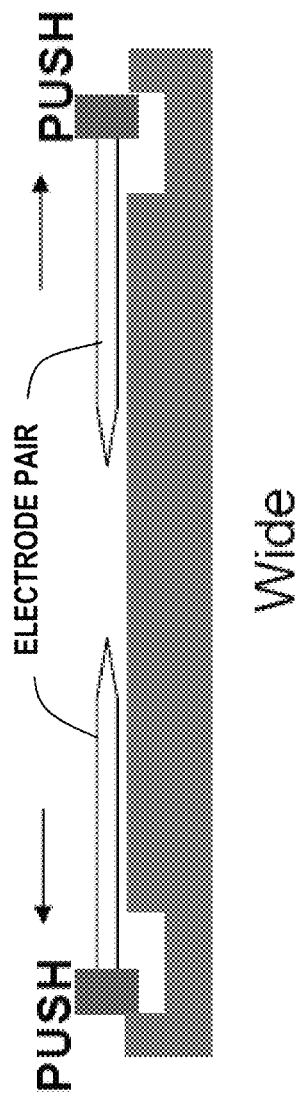
FIGS. 1A and 1B is a schematic representations of wide and narrow electrode gaps.
Figure 1B:
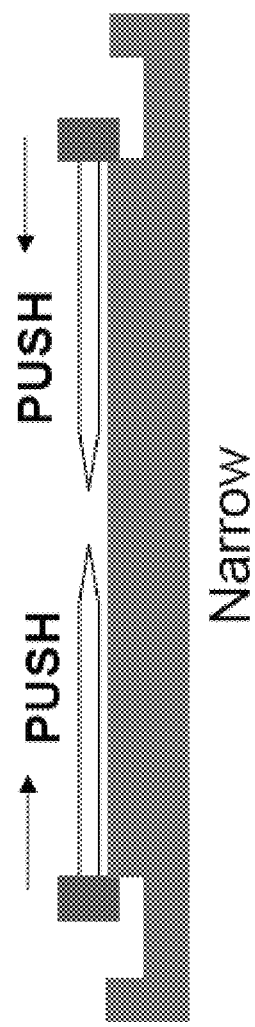
Figure 4A:
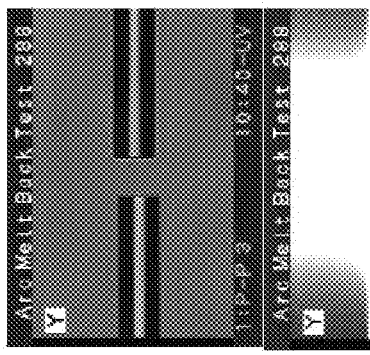
FIGS. 4A-4D are pictures showing a conventional arc calibration method.
Figure 4B:
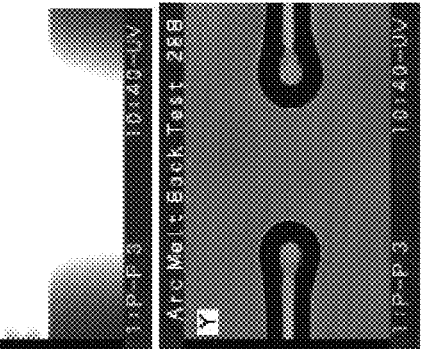
Figure 4C:
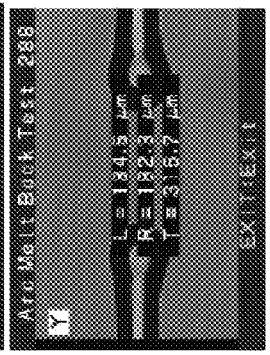
Figure 4D:
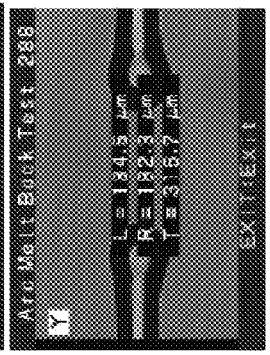
Figure 6A:
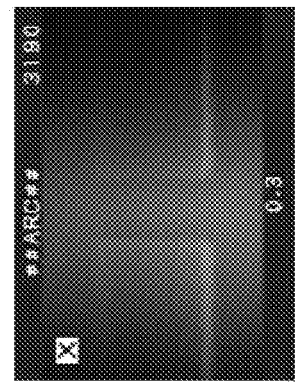
FIGS. 6A-6F are pictures showing an embodiment of the inventive arc calibration method.
Figure 6B:
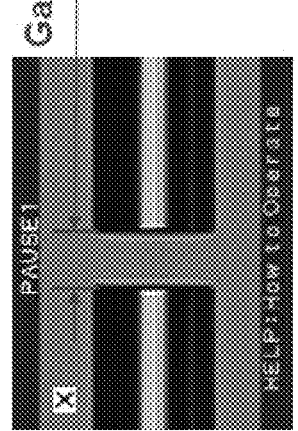
Figure 6C:
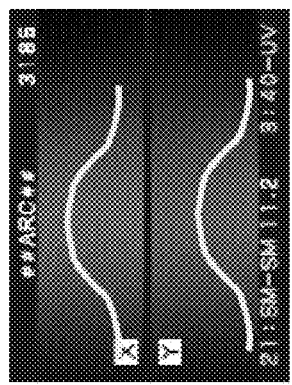

First, the user needs to determine where the center of the arc is so that the two fibers can be situated such that the ends of the fibers will be heated at the same temperature. This can be done by measuring the arc center, as shown in FIG. 6A. Next as shown in FIG. 6B, the gap (Gap 1) between the corners of the two fibers are measured. All of the measuring processes are performed automatically with conventional image processing technology. Then, as shown in FIG. 6C, the two fibers are heated with a low power/current arc. A typical low power/current arc would be 10 mA (0 bit), which generates a temperature of approximately 1500° C. to the fiber ends. The fibers are heated for approximately 0.3 seconds to create a "melt-back."

Figure 6D:
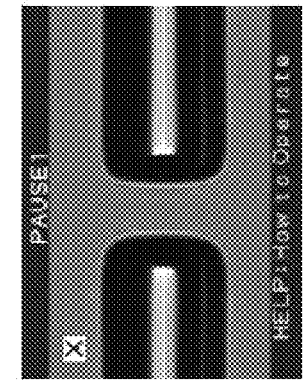
Figure 6E:
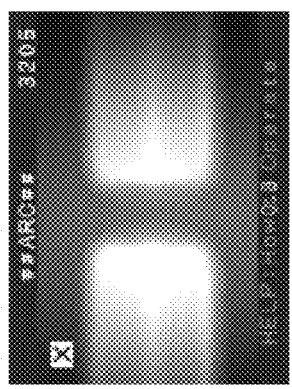
Figure 6F:
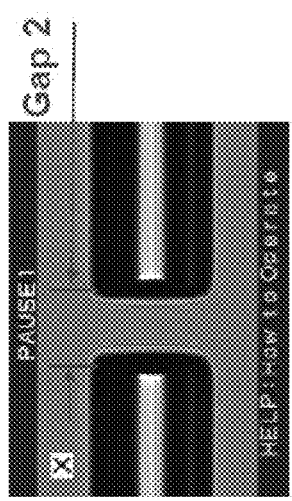

Next, as shown in FIG. 6D, the gap (Gap 2) between the melted-back corners of the two fibers are measured in order to determine the melt-back (Gap2-Gap1). A typical melt-back can range from 0 to 10 μm. Next, as shown in FIG. 6E, the arc power/current is increased and the fiber ends are heated again. A second melt-back is then determined. This process is repeated several times until enough melt-back measurements are obtained to calculate a melt-back slope. Preferably, four to ten arc power/current increases are made in order to get an accurate melt-back slope. However, fewer than four or more than ten arc power/current increases may be made. Typical increases in arc power/current are made in steps of 1 mA (25 bit).

Figure 7:
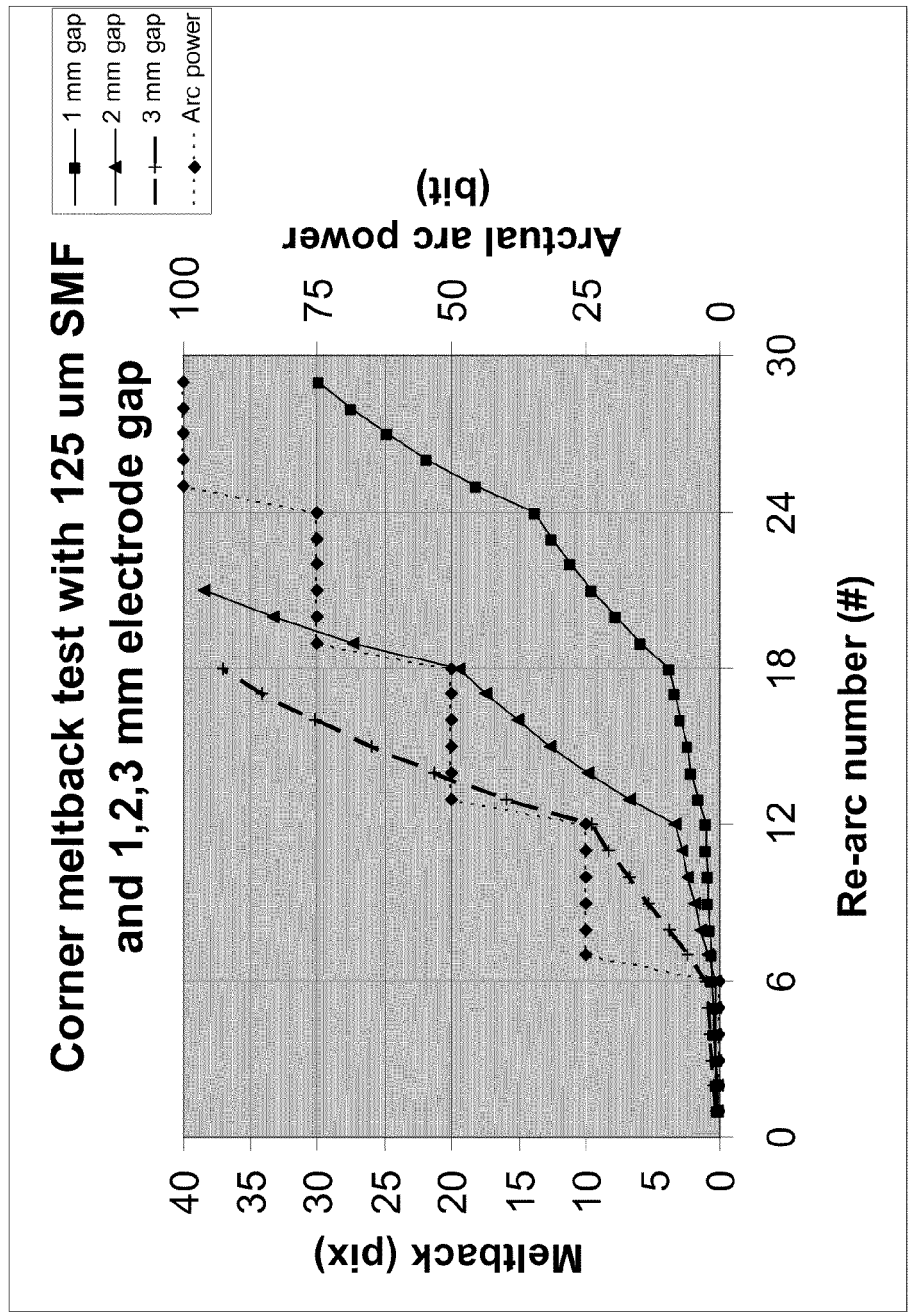
FIG. 7 is a graph showing the corner melt-back during arc calibration.
Figure 8:
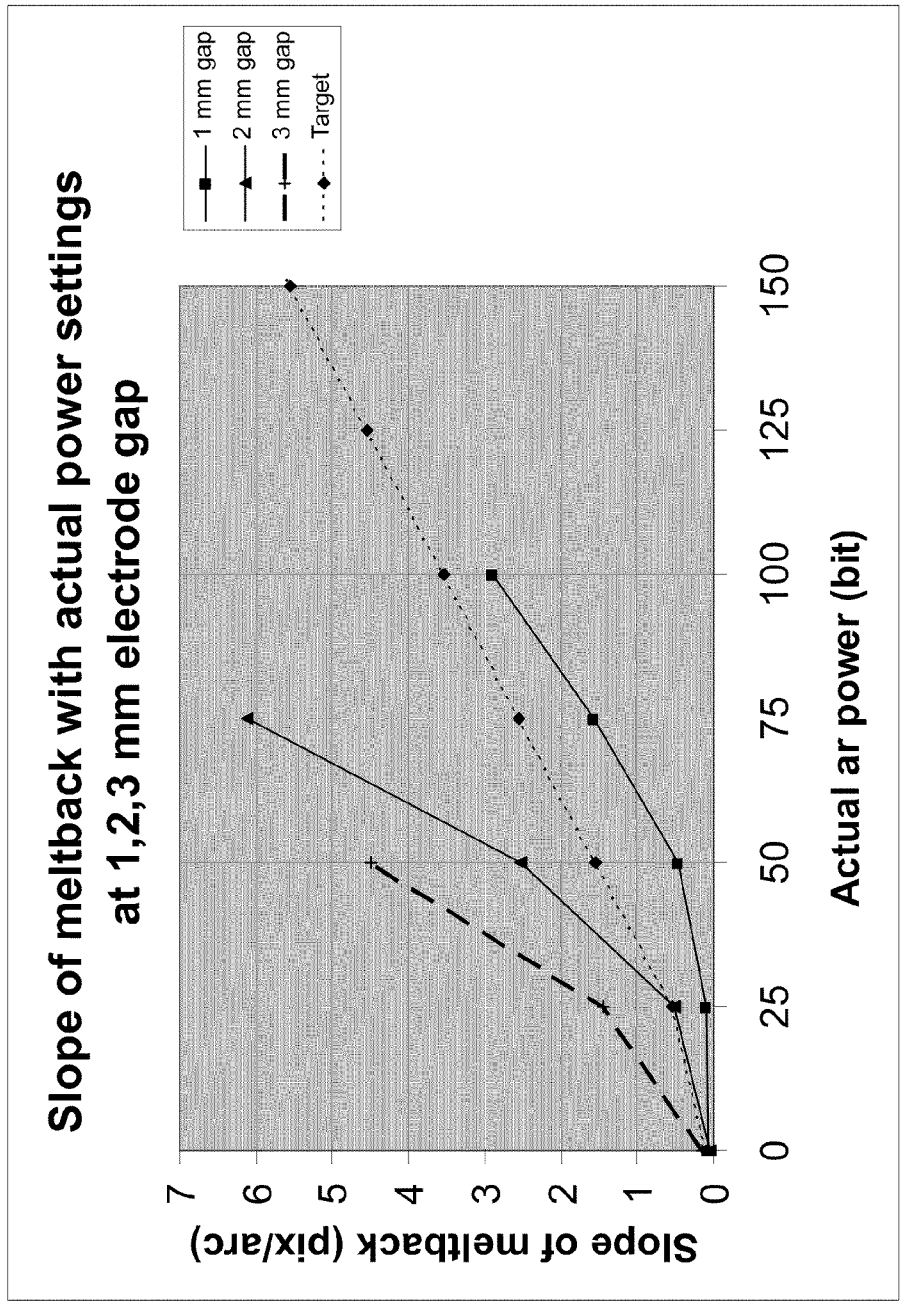
FIG. 8 is a graph showing the melt-back slopes before arc calibration.

After completing the automatic process described above, a melt-back chart, such as shown in FIG. 7, can be obtained. The melt-back chart can be used to compute the melt-back slope by subtracting all adjacent points in all of the curves of measurement in FIG. 7. The result is a chart of the slope (see FIG. 8). The unit of the Y axis of FIG. 8 is melt-back per arc in pixel (pix/arc), which is measured with image processing. The X axis is the arc power we used for achieving such melt-back slope. It can be observed that these slope values are very stable for different test samples. It can also be observed that with different electrode gaps, the slope values are very different at the same actual power setting. The goal the arc calibration process is to bring all the curves to the target line no matter what size of the electrode gap. This work can be accomplished by making a compensation between the set power/current and actual power/current. Software will calculate a compensation for power setting to move the measured curve to the target curve. For example, from the curves with 1 mm electrode gap, it can be observed in FIG. 8 that the curve shows 1.5 pix/arc at 25 bit actual power and 4.6 pix/arc at 50 bit actual power. From FIG. 8, the arc calibration process measures the difference in X-axis between the measured curve and target curve and make a 25 bit compensation at the 50 bit setting and a 75 bit compensation at the 125 bit setting, respectively. This is step 6, shown in FIG. 6F.

After the arc calibration, when the operator sets the power to 50 bit, the actual power is 25 bit, and when the operator sets the power to 125 bit, the machine actual power is 50 bit. Whenever a new cladding diameter fiber is spliced or a new electrode gap is selected, a new arc calibration should be performed before splicing.

Figure 9:
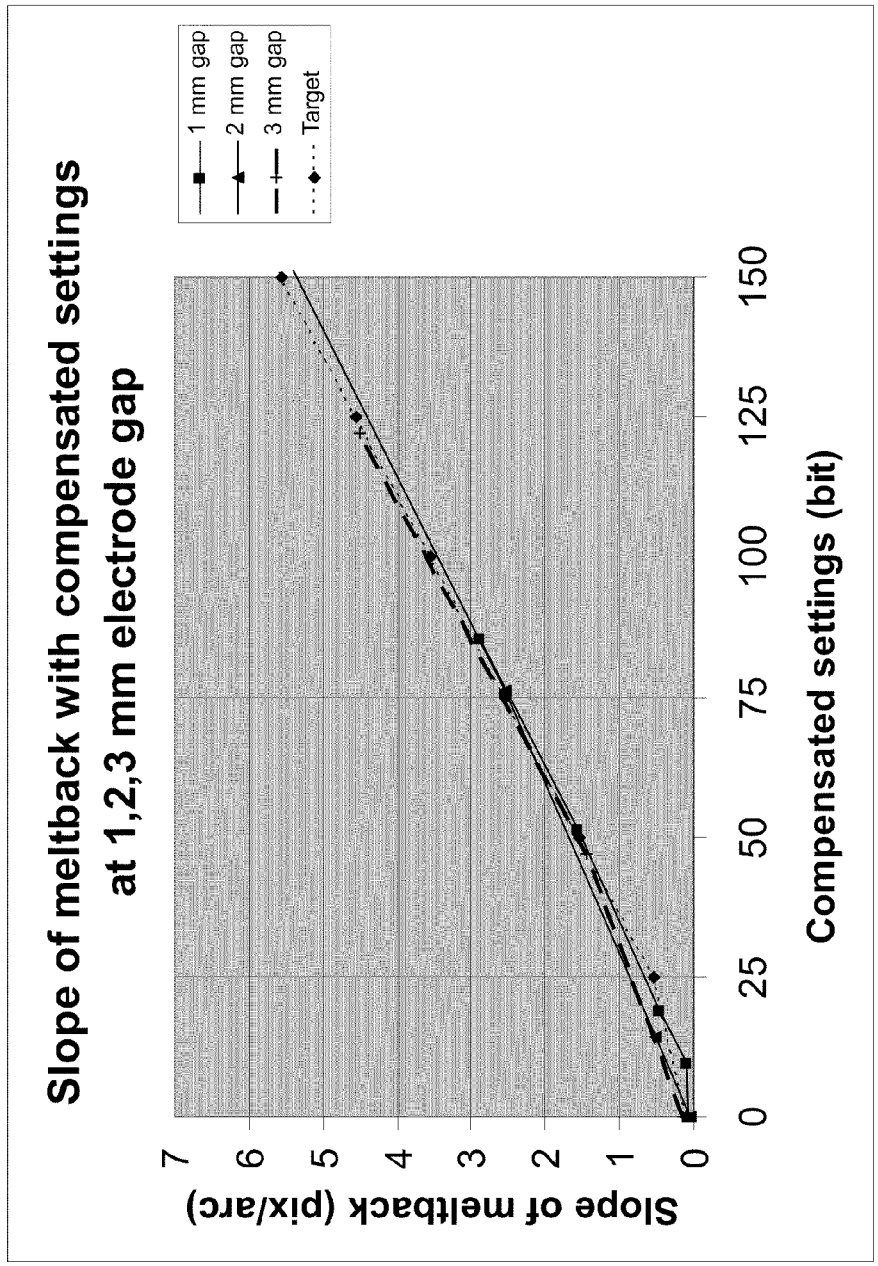
FIG. 9 is a graph showing melt-back slopes after arc calibration.

With the above described arc calibration method, the slope chart was re-measured with the same fiber and same electrode gap settings. The results are shown in the FIG. 9. It can be observed that the slope curves almost overlap each other with the target curve. This means that the same power setting will generate the same fiber temperature regardless of electrode gap setting.

To increase the stability of the process, the method was tested at every power level, 6 arc discharges (re-arc) were applied to the fiber ends. After every arc discharge, the melt-back value was measured at fiber corner. In the test, the melt-back was measured at three different electrode gap values: 1 mm, 2 mm, and 3 mm. With each electrode gap value, five melt-back experiments were conducted. It was observed that when the arc power was constant, the slope of the melt-back curve is also a constant. This indicates that the slope of the melt-back corresponds to fiber temperature in the arc. Thus, the actual power on each machine can be adjusted accordingly based on the slope of melt-back. In this way a uniform temperature can be achieved on all splicers.

Figure 10:
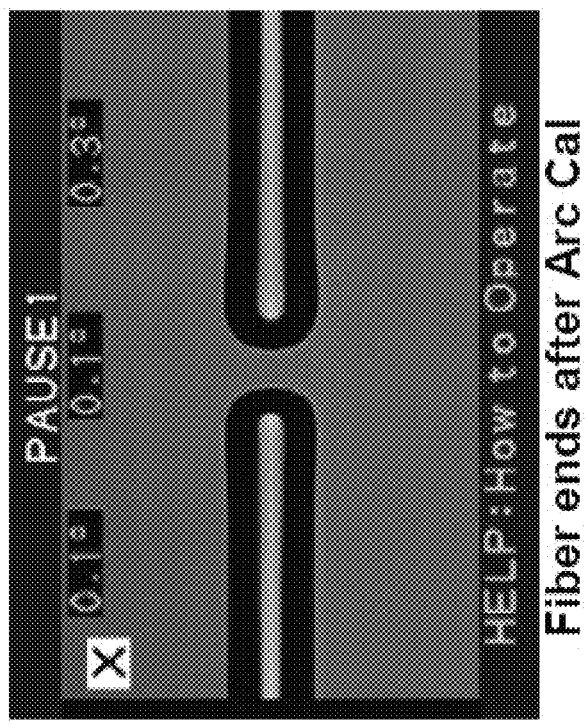
FIG. 10 is a picture of fiber ends after arc calibration for 125 μm cladding diameter fiber.

FIG. 10 shows fiber ends after arc calibration for 125 μm cladding diameter fibers. Compared to FIG. 5C, the melt-back of the new method is significantly less than in the conventional method.

Figures 11A, 11B, 11C:
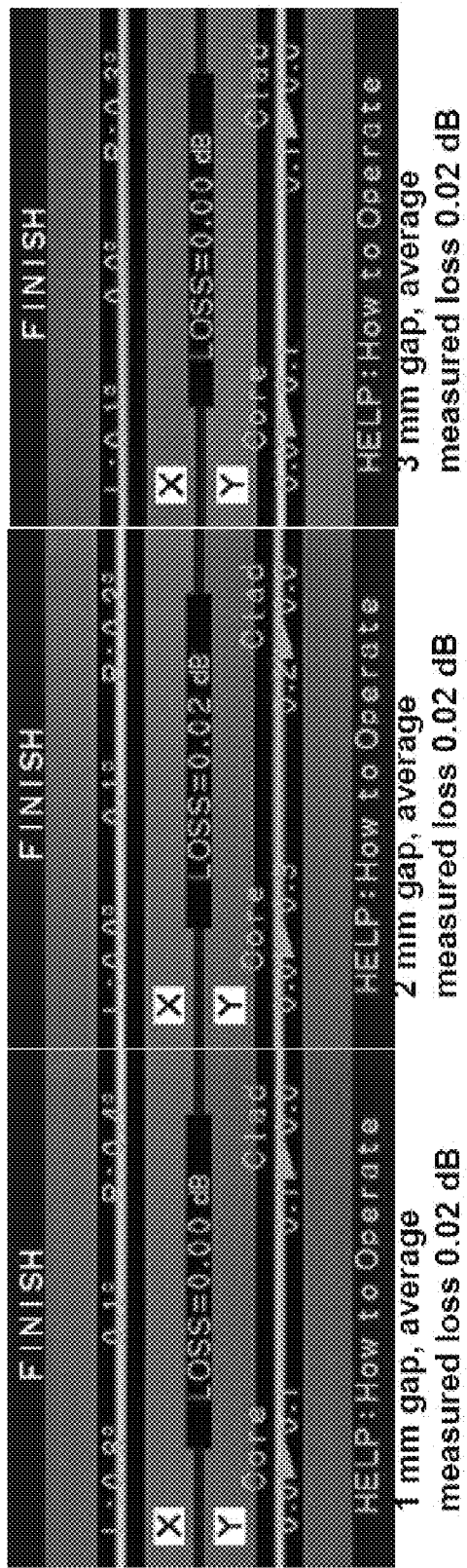
FIGS. 11A-11C are pictures showing splices after arc calibration for 125 μm cladding diameter fiber.

FIGS. 11A to 11C show splice losses of 125 μm cladding diameter fibers were unchanged at different electrode gap settings after the arc calibration. Previously, such a large electrode gap change would introduce a large discharge power change. Without the arc calibration, the 125 μm cladding diameter fiber would melt immediately at a 3 mm electrode gap.

Figure 12:
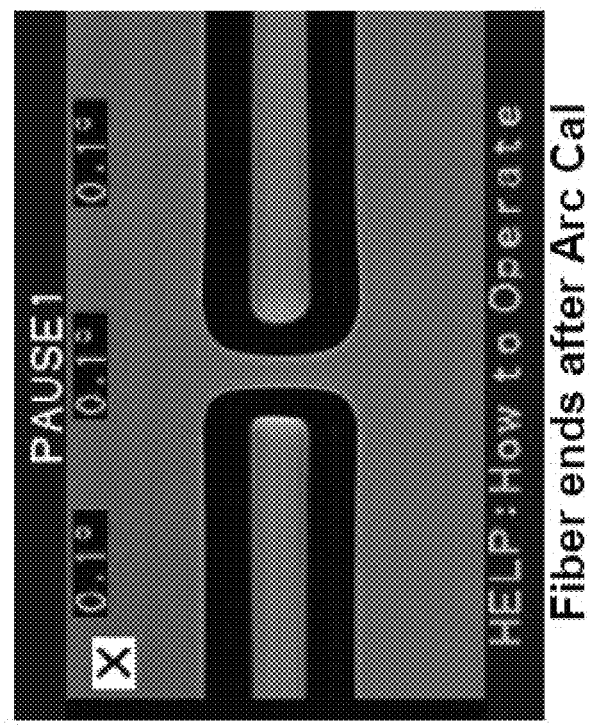
FIG. 12 is a picture of fiber ends after arc calibration for 250 μm cladding diameter fiber.
Figures 13A, 13B:
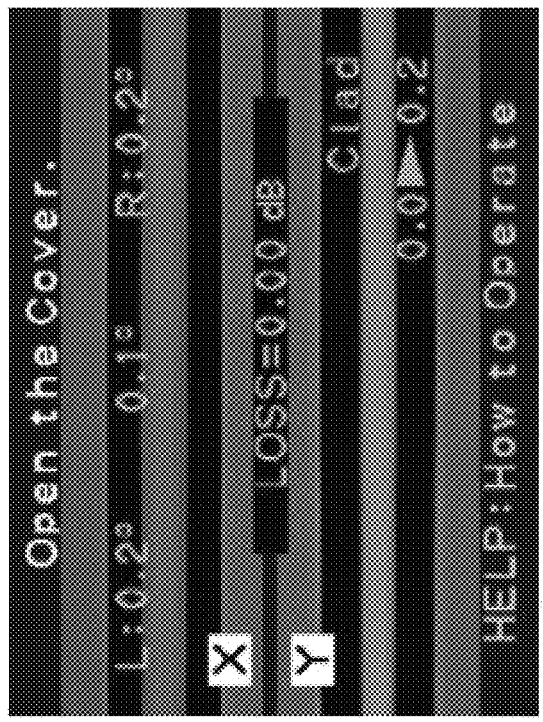
FIGS. 13A and 13B are pictures showing spliced after arc calibration for 250 μm cladding diameter fiber.

FIG. 12 shows fiber ends after arc calibration for 250 μm cladding diameter fibers. FIGS. 13A and 13B show splice losses of 250 μm cladding diameter fibers were unchanged at different electrode gap settings after the arc calibration.

Figure 14:
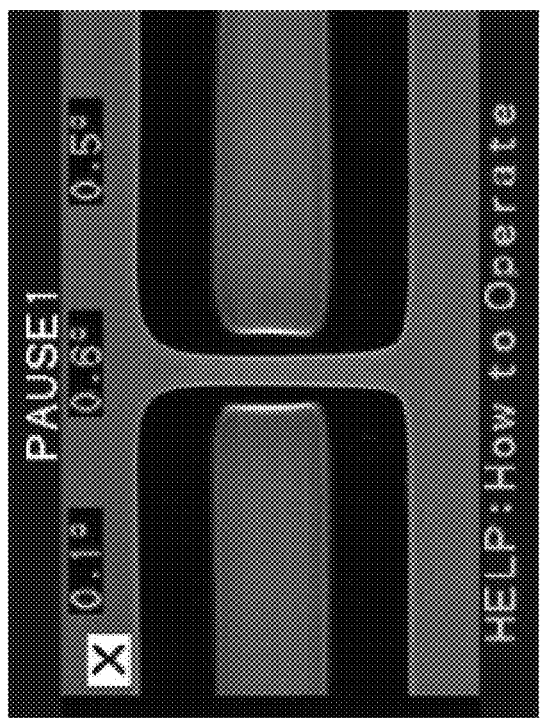
FIG. 14 is a picture of fiber ends after arc calibration for 400 μm cladding diameter fiber.
Figure 15:
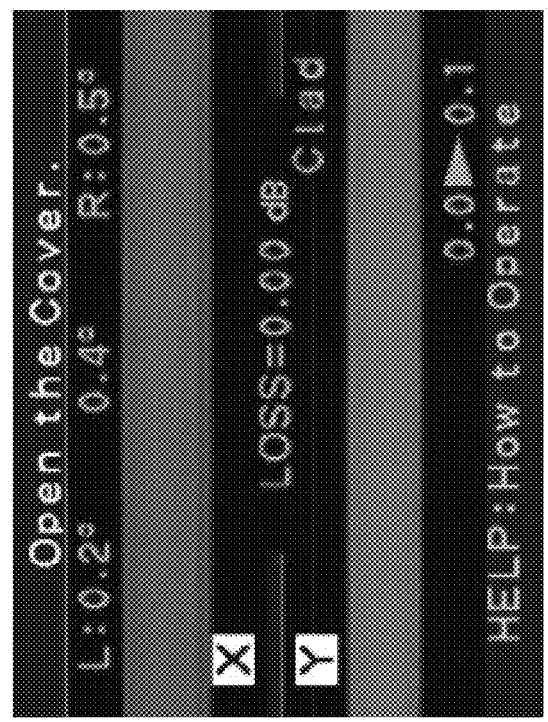
FIG. 15 is a picture showing splices after arc calibration for 400 μm cladding diameter fiber.

FIG. 14 shows fiber ends after arc calibration for 400 μm diameter fibers. FIG. 15 shows the splice loss of the 400 μm cladding diameter fiber after the arc calibration.

Figure 16B:
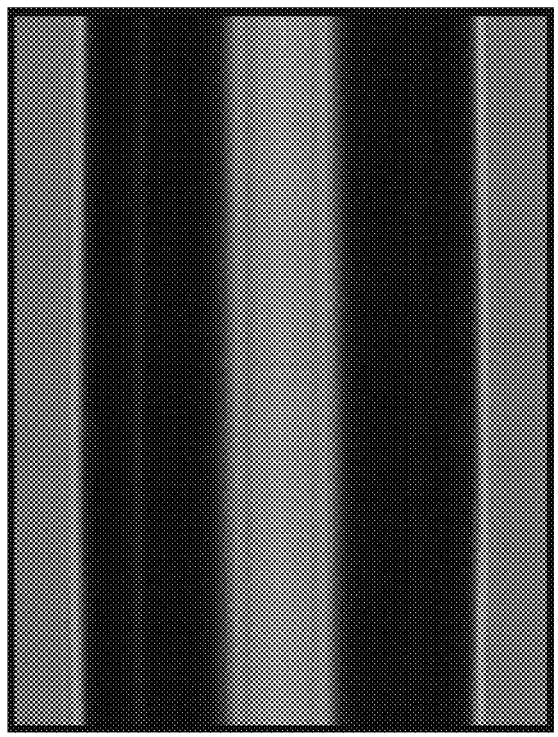
FIGS. 16A and 16B are pictures of improper and proper arc power for 400 μm cladding diameter fiber splices.
Figure 16A:
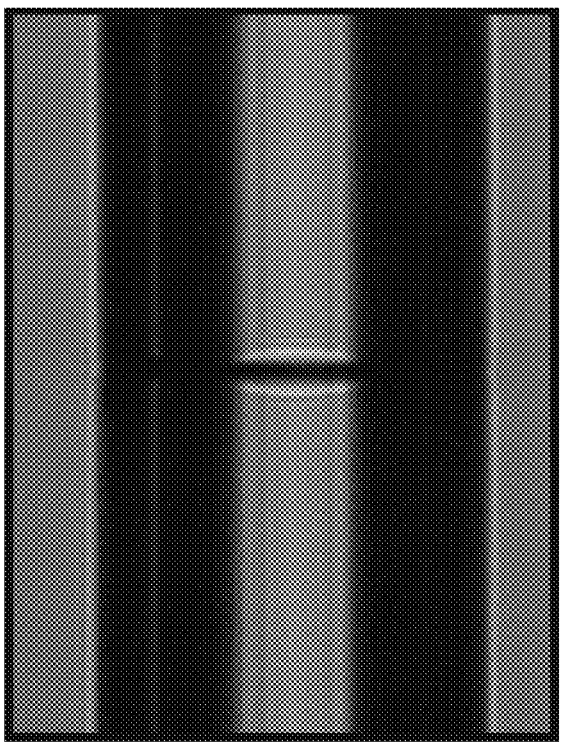

FIGS. 16A and 16B illustrates the improper arc power and proper arc power for 400 um diameter fiber splices.

In a second embodiment of an arc calibration method, the slope can be calculated based on the area of the melt-back at the corners of the fiber, rather than the distance. A chart similar to FIG. 7 would be generated, except that the Y axis would be a measure of melt-back area, instead of melt-back distance. This chart would then be used to create a chart of the slope, similar to FIG. 8.

In a third embodiment of an arc calibration method, rather than varying the power/current to adjust the heat of the arc, the power/current remains fixed and the fusion time (or time that the arc is on) varies in increasing predetermined amounts. In order for this method to be used, the power/current must be set such that the heat generated by the arc will be able to melt the fiber. For example, the heat must be at least approximately 1700° C. Typical "on" times would range between 0.05 and 1 second, depending on fiber size. Using this method, a chart similar to FIG. 7 would be generated, except that the X axis would be arc "on" time, rather than arc power/current. This chart would then be used to create a chart of the slope, similar to FIG. 8.

Figure 17:
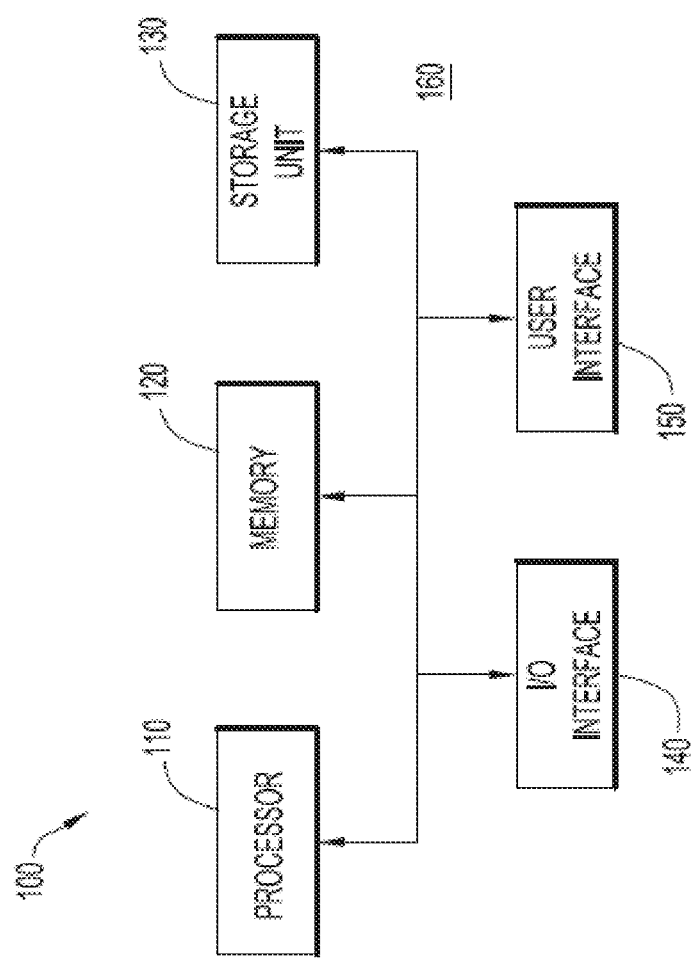
FIG. 17 shows how the method can be implemented with a splicer.

The arc calibration methods described above can be implemented in a splicer 100 such as shown in FIG. 17.

Referring to FIG. 17, the splicer 100 may include a processor 110, a memory 120, a storage unit 130, an I/O interface 140, a user interface 150, and a bus 160. The processor 110 may be a central processing unit (CPU) or microcontroller that controls the operation of the splicer 100 by transmitting control signals and/or data over the bus 160 that communicably connects the elements 110 to 150 of the splicer 100 together. The bus 160 may be a control bus, a data bus, or the like. The processor 110 may be provided with instructions for implementing and controlling the operations of the splicer 100, for example, in the form of computer readable codes. The computer readable codes may be stored in the memory 120 or the storage unit 130. Alternatively, the computer readable codes may be received through the I/O interface 140 or the user interface 150. As discussed above, the memory 120 may include a RAM, a ROM, an EPROM, or Flash memory, or the like. As also discussed above, the storage unit 130 may include a hard disk drive (HDD), solid state drive, or the like. The storage unit 130 may store an operating system (OS) and application programs to be loaded into the memory 120 for execution by the processor 110. The I/O interface 140 performs data exchange between the system and other external devices, such as other systems or peripheral devices, directly or over a network, for example a LAN, WAN, or the Internet. The I/O interface 140 may include a universal serial bus (USB) port, a network interface card (NIC), IEEE 1394 port, and the like. The user interface 150 receives input of a user and provides output to the user. The user interface 150 may include a mouse, keyboard, touchscreen, or other input device for receiving the user's input. The user interface 150 may also include a display, such as a monitor or liquid crystal display (LCD), speakers, and the like for providing output to the user.

Although a few exemplary embodiments of the present invention have been shown and described, it would be appreciated by those skilled in the art that changes may be made in this embodiment without departing from the principles and spirit of the invention, the scope of which is defined in the claims and their equivalents.

What is claimed:

1. A splicer comprising:
a pair of electrodes;
a processor and
a memory;
wherein said processor is configured to:
control the pair of electrodes to create an arc, thereby performing a first heating of an end of a first fiber and an end of a second fiber;
after the first heating, measure a first distance, in an axial direction, between a peripheral edge of the end of said first fiber and a peripheral edge of the end of said second fiber, and use the first distance to determine a first fiber end melt-back;
control the pair of electrodes to increase the heat of said arc, thereby performing a second heating of the end of said first fiber and the end of said second fiber;
after the second heating, measure a second distance, in the axial direction, between the peripheral edge of the end of said first fiber and the peripheral edge of the end of said second fiber, and use the second distance to determine a second fiber end melt-back;
determine a slope of the fiber end melt-back based on the first fiber end melt-back and the second fiber end melt-back; and
set a value in the memory to adjust the heat produced by said splicer, based on said slope of the fiber end melt-back;
wherein said slope is a slope formed on a graph including the first heating and the second heating on an x-axis, and the first fiber end melt-back and the second fiber-end melt back on a y-axis.

2. The splicer of claim 1 wherein said heat is increased by increasing a power of said arc, and wherein said value is a power value.

3. The splicer of claim 1 wherein said heat is increased by increasing a current of said arc, and wherein said value is a current value.

4. The splicer of claim 1 wherein said fiber end melt-back is a distance by which the end of one of said first fiber and said second fiber has melted.

5. The splicer of claim 1 wherein said fiber end melt-back is a melted area of one of said first fiber and said second fiber calculated using the distance, in the axial direction, between the peripheral edge of the end of said first fiber and the peripheral edge of the end of said second fiber.

6. The splicer of claim 1 wherein the controller is configured to control the electrodes to increase the heat of said arc and heat the ends of said first fiber and said second fiber four to ten times.

7. A splicer comprising:
a pair of electrodes;
a processor and
a memory;
wherein said processor is configured to:
control the pair of electrodes to create an arc and to heat an end a first fiber and an end of a second fiber with said arc for a first predetermined amount of time;
after the first predetermined amount of time, measure a first a distance, in an axial direction, between a peripheral edge of the end of said first fiber and a peripheral edge of the end of said second fiber, and use the first distance to determine a first fiber end melt-back;
control the pair of electrodes to create said arc and to heat the end of said first fiber and the end of said second fiber with said arc for a second predetermined amount of time, which is longer than said first predetermined amount of time;
after the second predetermined amount of time, measure a second distance, in an axial direction, between the peripheral edge of the end of said first fiber and the peripheral edge of the end of said second fiber, and use the second distance to determine a second fiber end melt-back;
determine a slope of the fiber end melt-back based on the first fiber end melt-back and the second fiber-end melt back; and
set a value in the memory to adjust the heat produced by said pair of electrodes based on the slope of the fiber end melt-back;
wherein said slope is a slope formed on a graph including the first predetermined amount of time and the second predetermined amount of time on an x-axis, and the first fiber end melt-back and the second fiber-end melt back on a y-axis.

* * * * *